United States Patent [19]

Meyer et al.

[11] 3,919,192
[45] Nov. 11, 1975

[54] 5-AMINO-4-SUBSTITUTED IMIDAZOLE NUCLEOTIDES

[75] Inventors: Rich B. Meyer, Laguna Beach; Dennis A. Shuman, Mission Viejo, both of Calif.

[73] Assignee: ICN Pharmaceuticals, Irvine, Calif.

[22] Filed: Aug. 4, 1972

[21] Appl. No.: 277,868

Related U.S. Application Data

[63] Continuation-in-part of Ser. No. 255,804, May 22, 1972.

[52] U.S. Cl. ............ 260/211.5 R; 424/180
[51] Int. Cl.² ............................. C07H 19/04
[58] Field of Search ............ 260/211.5 R

[56] References Cited
UNITED STATES PATENTS

| | | | |
|---|---|---|---|
| 3,332,935 | 7/1967 | Yamazaki et al. | 260/211.5 R |
| 3,535,207 | 10/1970 | Shiro et al. | 260/211.5 R |
| 3,678,030 | 7/1972 | Yamazaki et al. | 260/211.5 R |
| 3,712,885 | 1/1973 | Weimann et al. | 260/211.5 R |
| 3,751,408 | 8/1973 | Bergmeyer et al. | 260/211.5 R |

*Primary Examiner*—Johnnie R. Brown
*Attorney, Agent, or Firm*—Lyon and Lyon

[57] ABSTRACT

5-Amino-4-substituted imidazole nucleotides are disclosed, as well as a process of making the same, which are useful to inhibit the enzyme phosphodiesterase, to activate steroidogenesis and protein kinase, and as intermediates in the synthesis process.

18 Claims, No Drawings

5-AMINO-4-SUBSTITUTED IMIDAZOLE NUCLEOTIDES

This application is a continuation-in-part of Ser. No. 255,804, filed May 22, 1972, entitled "Synthesis of 6-Substituted Nucleotides."

BACKGROUND OF THE INVENTION

As reported by Sutherland et al. in "Cyclic AMP," Am. Rev. Biochem. 37, 149 (1968), cyclic adenosine monophosphate (C-AMP) has been established as an intracellular "second messenger," mediating many of the actions of a variety of different hormones. According to this theory, first messenger hormones, such as epinephrine and norepinephrine, influence adenyl cyclase contained at or within cell walls to form intracellulary cyclic AMP from adenosine triphosphate upon receipt of the extra-cellular hormone signal. The formed cyclic AMP in turn functions as a second messenger and stimulates intracellular functions particular to the target cells of the hormone. Cyclic AMP has thus been shown to "activate" protein kinases, which in turn produce physiological effects such as muscle contraction, glycogenolysis, steroidogenesis and lipolysis. A specific example of mediation of steroidogenesis by C-AMP is cellular biosynthesis and excretion of corticosteriods as occasioned by C-AMP formed by adenyl cyclase within the cell walls of the adrenal cortex upon receipt of an extracellular signal carried by the peptide hormone ACTH.

In addition to the foregoing and as representative of the diverse roles played by C-AMP in biological processes can be mentioned implication of C-AMP as a participant in or mediator of the following metabolic reactions or pharmacologic agents: glucagon, vasopressin, lutenizing hormone, thyroid-stimulating hormone, insulin, UDPG-α-trans-glucosylase, phosphofructokinase, tryptophan pyrrolase, ketogenesis, amino acid uptake into liver proteins, acetate incorporation into fatty acids and cholesterol of liver, conversion of lactate to glucose (gluconeogenesis), release of amylase, water and ion permeability, sugar transport, acid secretion in the gastric mucosa, platelet aggregation inhibition, catabolite repression, potentiation of antiviral activity of interferon, inhibition of HeLa and strain L cells in culture, and stimulation of antibody production (immunologic mechanism).

The so-called adrenergic effects of many hormones and drugs are also attributed to the intracellular effects of cyclic AMP, whose concentration is controlled by adenyl cyclase and cyclic nucleotide phosphodiesterase. Recent investigations have shown that at least part of the physiological effect of cyclic AMP is a result of the activation of specific protein kinases by cyclic AMP as, for example, in neurotubules isolated from the central nervous system.

As a corollary to the increasing recognition of the role played by cyclic AMP, it has been suggested that it be administered in aid of lagging cellular processes. One example is the report that asthma may be caused by a genetic deficiency of adenyl cyclase. A consequence of such deficiency, of course, is a diminished capacity to intracellularly convert ATP to cyclic adenosine monophosphate.

Cyclic AMP is degraded, however, in vivo by phosphodiesterase enzymes, which catalyze hydrolysis of the cyclic purine nucleotide to 5'-adenosine monophosphate with a consequent loss of function. It has accordingly been suggested that substituted cyclic AMP analogs, which are more resistant to phosphodiesterase degradation than the naturally occurring cyclic nucleotide but which nevertheless retain the biological activity of the naturally occurring nucleotide might be administered in aid of lagging cellular processes. The availability of such C-AMP analogs, for example, could permit maintenance of desired cyclic nucleotide monophosphate levels at dosages reduced from those required with C-AMP itself. Furthermore, the differing specificity of the phosphodiesterase toward cyclic nucleotides of widely varying structure, could enhance the utility of compounds which exhibit different susceptibilities of diesterases of widely varying specificities.

Sutherland et al., in Circulation 37, 279 (1968) suggest that the pharmacological effects of theophylline are the result of its ability to inhibit the action of phosphodiesterase enzymes. Theophylline has thus been employed in lieu of the adenyl cyclase-stimulating hormones, epinephrine and norepinephrine, as a heart stimulant following cardiac arrest and in refractory asthma cases as a bronchial dilator. Theophylline, however, does not selectively inhibit phosphodiesterase, but rather gives general stimulation to the central nervous system. Accordingly, the use of theophylline can make the recipient nervous and irritable and can also create cardiovascular effects, i.e., rapid beating. By the same token, theophylline is not as potent a phosphodiesterase inhibitor as is desired and consequently has to be used in larger quantities, which, of course, can further the undesirable effects enumerated above.

From the foregoing, it is clear that it would be advantageous to have cyclic AMP analogs which are resistant to phosphodiesterase degradation and capable of inhibiting phosphodiesterase enzymes, especially on a selective basis, and of activating adrenal steroidogenesis and protein kinase. It would also be desirable to provide an efficient and satisfactory synthesis process.

SUMMARY OF THE INVENTION

This invention provides 5-amino-4-substituted imidazole nucleotides of the following structure:

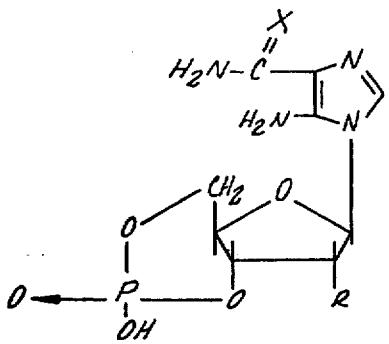

in which X and R are as defined hereinafter, and their physiologically acceptable salts, as for example, ammonium, alkali metal or alkyl amine salts.

DETAILED DESCRIPTION OF THE INVENTION

The imidazole nucleotides of the present invention are synthesized by the following process wherein "Rcp" in the schematic illustration implies β-D-ribofuranosyl-3,5-cyclic phosphate.

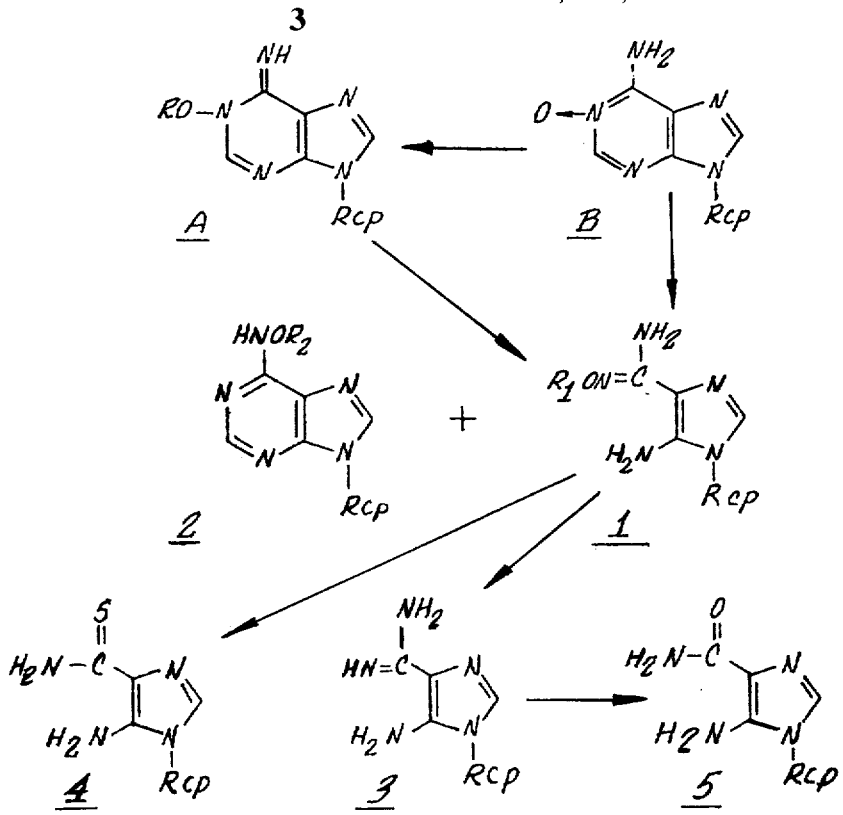

At this point, reference should be made to the copending applications of Dennis A. Shuman et al., Ser. No. 234,371, filed Mar. 13, 1972, now abandoned "6-Substituted Purine Nucleotides," and Ser. No. 255,804 filed May 22, 1972, "Synthesis of 6-Substituted Purine Nucleotides," wherein the synthesis of N-alkoxy- and N-hydroxy-5-amino-1-β-D-ribofuranosylimidazole-4-carboxamidine 3', 5'-cyclic phosphate (Compound 1 in the foregoing representation) is generally described. Thus, adenosine 3', 5'-cyclic phosphate 1-N-oxide (Compound B) may be prepared from cyclic AMP following generally the procedure of T. Posternak et al, Biochem. Biophys. Acta. 65, 558 (1962), by the action of excess m-chloroperbenzoic acid in sodium acetate. Alkylation of the N-oxide compound with methyl iodide yields the corresponding N-methoxide (Compound A in the foregoing schematic illustration), while alkylation with other alkyl or aralkyl halides likewise yields the corresponding alkoxides. Alkylation normally will be effected at room temperature in a solvent such as dimethyl sulfoxide (DMSO), and generally from about 30 minutes to about 1 hour is sufficient time. Base-catalyzed hydrolysis of the N-alkoxide compounds affords a Dimroth rearrangement product (Compound 2) and N-alkoxy--amino-aminoAl-β-D-ribofuranosylimidazole-4-carboxamidine 3',5'-cyclic phosphate (Compound 1) in ratios varying according to pH. A pH from about 7 to about 9 will optimize the yield of Compound 2 while a pH of at least 10, and preferably more strongly alkaline conditions such as pH of 14, optimizes the yield of Compound 1. Alternatively, in a preferred form, Compounds 1 and 2 (where $R_1$ and $R_2$ are H) may be prepared directly from Compound B by subjecting the latter to alkaline hydrolysis with refluxing sodium hydroxide followed by ion exchange chromatography, as per the general procedure of M. A. Stevens et al, J. Am. Chem. Soc., 81, 1734 (1959).

Compound 1 may be converted readily to 5-amino-1-β-D-ribofuranosylimidazole-4-carboxamidine 3', 5'-cyclic phosphate (Compound 3) by reduction. Although reductive techniques using metals as electron donors, for example zinc metal in acetic acid, give good conversion, the preferred procedure is by means of catalytic hydrogenation, preferably utilizing sponge nickel as a catalyst, at a pressure of from 2 to 3 atmospheres of hydrogen and 60°C in aqueous solution. Other commonly used hydrogenation catalysts, e.g., platinum, palladium-carbon, etc., may also be employed. Although the reaction will proceed at lower temperatures, the elevated temperature is used to keep the product in solution.

Treatment of Compound 1 with an aqueous solution of pyridine containing a molar excess of hydrogen sulfide, as for example a 2:1 volume ratio of $H_2S$ to pyridine, under the conditions reported by Ueda et al, Tetrahedron Letters, 2507, (1971) yields 5-amino-1β-D-ribofuranosylthioimidazole-4-carboxamide 3', 5'-cyclic phosphate (Compound 4). The reaction is preferably conducted in a closed container, such as a bomb, at elevated temperatures of, for example 50° to about 80°C, for a period of from about 4 to about 24 hours. When Compound 3 is subjected to alkaline hydrolysis, 5-amino-1-β-D-ribofuranosylimidazole-4-carboxamide 3', 5'-cyclic phosphate (Compound 5) occurs, which, according to published German application No. 2026040 influences lypolysis and demonstrates antilipolytic activity. Such compounds are preferably prepared utilizing concentrated aqueous ammonia in a closed container such as a bomb at a temperature of 100°C.

The permissible limits of the various processing steps, that is, alkylation, reduction, hydrolysis, etc., will vary depending upon factors such as the reagents used, as will be apparent to the art skilled given the description herein and the cited publications, which are incorporated by reference herein. For example, with the O-alkylated derivatives (Compound A), base-catalyzed hydrolysis will be carried out at room temperature in aqueous sodium hydroxide for from about 24 to about 48 hours to provide a 10:1 product ratio of Compound 1 to Compound 2, whereas the use of refluxing sodium bicarbonate for approximately 45 minutes, as per Fujii et al., *Tetrahedron* 27, 2415 (1971), affords a 1:2.5 ratio of Compound 1 to Compound 2. Cyclic AMP 1-N-oxide (Compound B) affords a 3:1 ratio of Compound 1 to Compound 2 upon hydrolysis in refluxing sodium hydroxide for approximately 10 minutes.

In the foregoing structural representation of the nucleotides of this invention and as will be more apparent from the illustrative examples which follow, X may be NH, NOR$_1$ or S. R$_1$ will be hydrogen, or an alkyl or aralkyl group, preferably C$_1$ to C$_8$, and more preferably C$_1$ to C$_4$, linear or branched alkyl or benzyl. R will be hydrogen, OH, or OR' where R' is C$_1$ to C$_{18}$ acyl. The invention will be better understood by reference to the following specific but illustrative examples.

EXAMPLE I

Preparation of 1-Methoxyadenosine 3', 5'-cyclic phosphate

Adenosine 3', 5'-cyclic phosphate N$^1$-oxide (76.0 g, 0.200 mole) as the dihydrate was dissolved in a solution of 400 ml DMSO and 31 g (0.204 mole) 1,5-diazabicyclo[5.4.0]undec-5-ene. The solution was cooled to 15°, and 40 ml methyl iodide was added with stirring at ambient temp. After 30 min., the mixture had gelled; 1.5 l ethanol was added and the solid was thoroughly homogenized by vigorous stirring. The solid was filtered, and the resulting paste was resuspended in 2 l ethanol and homogenized. The product was again filtered, washed with ethanol and ether, and dried, giving 80.4 g product suitable for further transformation. For analysis, a sample was precipitated from aqueous methanol with ether.

Anal. Calcd for C$_{11}$H$_{14}$N$_5$O$_7$P.½H$_2$O: C, 35.88; H, 4.11; N, 19.02%. Found: C, 35.88; H, 4.46; N, 18.69%.

EXAMPLE II

Preparation of 5-Amino-1-β-D-ribofuranosylimidazole-4-carboxamidoxime 3',5'-cyclic phosphate hydrate (Compound 1) and 6-hydroxylamino-9-β-D-ribofuranosylpurine 3', 5'-cyclic phosphate hydrate (Compound 2)

Seventy grams (0.184 mole) of cyclic AMP N$^1$-oxide dihydrate was dissolved in 90 ml 2N NaOH and poured into a refluxing solution of 700 ml 2N NaOH. Refluxing was continued for 10 minutes, and the burgundy colored solution was poured into sufficient ice to bring the temperature to 25°. The pH was adjusted to 10–11 by portion wise addition of Dowex 50 × 8 (H$^+$). The resin was filtered and washed well and the filtrate was passed onto a column (7 ×42 cm) containing 1400 ml Dowex 1 × 2 (formate). The column was washed with 2 l water, then was eluted with a gradient of 4 l water in the mixing chamber and 4 l 0.5N formic acid in the reservoir. The eluate was monitored for absorbance at 254 nm and 24 ml fractions were collected. Compound 1 began to appear after about 5 l of elution solution had passed through. Fractions containing pure Compound 1 were pooled and evaporated to a small volume (< 100 ml) in vacuo, and then diluted with 1 l EtOH and chilled. Compound 1 was collected on a filter and washed with EtOH; yield 28.0 g (43%). Anal. Calcd for C$_9$H$_{14}$N$_5$O$_7$P.H$_2$O: C, 30.60; H, 4.57; N, 19.83%. Found: C, 30.50; H, 4.41; N, 19.74%.

After all Compound 1 had been eluted, the gradient chambers were filled with 4 l 1.0 N formic acid in the mixing chamber and 4 l 2.0N formic acid in the reservoir. Elution was continued, collecting 24 ml fractions, until Compound 2 began to appear (after about 4 l of eluate had passed). The appropriate fractions containing pure Compound 2 were pooled and evaporated to a small volume, then diluted with 10 volumes of ethanol and chilled. The product was collected on a filter; yield, 8.0g (12%).

Anal. Calcd for C$_{10}$H$_{12}$N$_5$O$_7$P.H$_2$O: C, 33.06; H, 3,89; N, 19.28%. Found: C, 33.34; H, 3.73; N, 19.59%.

EXAMPLE III

Preparation of 5-Amino-N-methoxy-1-β-D-ribofuranosylimidazole-4-carboxamidine 3', 5'-cyclic phosphate (Compound 1) and 6-methoxyamino-9-β-D-ribofuranosylpurine 3', 5'-cyclic phosphate (Compound 2).

A solution of 30 g N$^1$-methoxyadenosine 3', 5'-cyclic phosphate (81.5 mmole), 20 g NaHCO$_3$ (238 mmole), and 300 ml H$_2$O was refluxed 45 min. The pH of the solution was adjusted to 2.5 with Dowex 50×8(H$^+$) while warm, and a water pump vacuum was applied to the mixture to remove CO$_2$. The pH was readjusted to 9–10 with NaOH, and the resin was removed by filtration. The solution was passed onto a column containing 400 ml Dowex 1×2 (formate, 100–200 mesh), and the column was washed well with water. The column was eluted with a gradient of 4 liters water in the mixing chamber and 4 liters 4N formic acid in the reservoir. The first major product, coming after about 2 liters of eluate, was Compound 1, giving 5.4 g (19%) after evaporation of the solvent and trituration of the residue with ethanol. A sample was recrystallized from water for analysis.

Anal Calcd for C$_{10}$H$_{16}$N$_5$O$_7$P: C, 34.39; H, 4.62; N, 20.05%. Found: C, 34.54; H, 4.70; N, 19.96%.

After approximately 6 liters of eluate, another product began to appear. Evaporation of the appropriate fractions and precipitation of the product from aqueous methanol with ether gave 14.6 g Compound 2 (49%).

Anal. Calcd for C$_{11}$H$_{14}$N$_5$O$_7$P.½ H$_2$O: C, 35.88; H, 4.11; N, 19.02%. Found: C, 35.64; H, 4.09; N, 18.71.

EXAMPLE IV

Preparation of 5-Amino-N-ethoxy-1-β-D-ribofuranosylimidazole-4-carboxamidine 3', 5'-cyclic phosphate (Compound 1) and 6-Ethoxyamino-9-β-D-ribofuranosylpurine 3', 5'-cyclic phosphate (Compound 2).

A solution of 5.5 g 1-ethoxyadenosine 3', 5'-cyclic phosphate (14 mmole) and 50 ml 1N NaOH was stirred 20 hr at ambient temperature. The solution was diluted with 450 ml water and passed through a 4 × 16 cm column of Dowex 1 × 2 (formate form, 100–200 mesh) and washed with water. The products were eluted with a gradient of 2 l water in the mixing chamber and 2 l 3N formic acid in the reservoir. Evaporation of the appropriate fractions gave 2.9 g Compound 1 (56%) and 0.28 g Compound 2 (5%).

Anal. Compound 1: Calcd for $C_{11}H_{18}N_5O_7P$—0.5-$H_2O$; C, 35.49; H, 5.14; N, 18.81%. Found: C, 35.28; H, 4.95; N, 19.10%.

Compound 2: Calcd for $C_{12}H_{16}N_5O_7P.O.5H_2O$; C, 37.70; H, 4.48; N, 18.32%. Found: C, 37.41; H, 4.48; N, 18.42%.

At this point, we should note that other N-alkoxy or N-aralkoxy substituted compounds may also be prepared following the procedure of Example III and IV utilizing appropriate 1-substituted adenosine 3', 5'-cyclic phosphate, as will be apparent to the art skilled, given the disclosure herein.

EXAMPLE V

Preparation of 5-Amino-1-β-D-ribofuranosylimidazole-4-carboxamidine 3', 5'-cyclic phosphate (Compound 3)

A solution of 5.0 g (14.3 mmoles) 5-amino-N-methoxy-1-β-D-ribofuranosylimidazole-4-carboxamidine 3', 5'-cyclic phosphate in 200 ml $H_2O$, preheated to 60° and containing approximately 5 g moist sponge nickle catalyst, was shaken with 2–3 atm $H_2$ at 60° for 2 hours. The filtered solution was evaporated to dryness to give 3.75 g Compound 3 (82%). A sample was recrystallized from $H_2O$ for analysis.

Anal. Calcd for $C_9H_{14}N_5O_6P$: C, 33.86; H, 4.42; N, 21.94. Found: C, 33.53; H, 4.63; N, 21.77.

EXAMPLE VI

Preparation of 5-Amino-1-β-D-ribofuranosylthioimidazole-4-carboxamide 3', 5'-cyclic phosphate (Compound 4)

To a frozen solution of 10 g (28.7 mmole) of Compound 1 ($R_1$ is $CH_3$) in 25 ml $H_2O$ in a bomb, was added a solution of 50 ml liquid $H_2S$ in 25 ml pyridine. The sealed bomb was placed in an oil bath maintained at 60°–70° for 5 hours, then cooled and opened. The solution, after being allowed to warm to room temperature, was diluted with 100 ml $H_2O$, filtered, and evaporated to dryness. The residue was taken up in 200 ml $H_2O$ and filtered, and the pH was adjusted to 2.0 with HCl. The resulting precipitate was purified by dissolution in $H_2O$ with sufficient $NH_4OH$ added to bring the pH to 7, then acidification to pH 2.0. The filtered and dried product weighed 1.48 g (14.5%).

Anal. Calcd for $C_9H_{13}N_4O_6PS.H_2O$: C, 30.51; H, 4.27; N, 15.82; Found: C, 30.25; H, 3.89; N, 15.81.

EXAMPLE VII

Preparation of 5-Amino-1-β-D-ribofuranosylimidazole-4-carboxamide 3', 5'-cyclic phosphate (Compound 5)

A mixture of 4.0 g (12.5 mmole) Compound 3 and 100 ml conc $NH_4OH$ was heated in a bomb at 100° for 16 hours, then cooled and evaporated in vacuo. The residue was taken up in 100 ml $H_2O$ and applied to a 2.5 × 20 cm column of Dowex 1 × 2 (formate form, 100–200 mesh). After washing well with $H_2O$, the column was eluted with a gradient of 1 liter $H_2O$ in the mixing chamber and 1 liter 3N formic acid in the reservoir. Fractions containing the product, appearing near the end of the elution, were evaporated. Trituration of the residue with EtOH gave 2.90 g (68%).

Anal. calcd for $C_9H_{13}N_4O_7P.H_2O$: C, 31.96; H, 4.47; N, 16.57. Found: C, 31.90; H, 4.24; N, 16.60.

EXAMPLE VIII

Inhibition Of Phosphodiesterase Enzyme

3', 5'-cyclic AMP phosphodiesterase (PDE) has been isolated and purified from two different tissues in the following manner. Homogenates of rabbit lung and kidney, and beef heart were made in sucrose-Tris-magnesium buffer and were subjected to centrifugation at low speed to remove nuclei and cell debris. The supernatants were then centrifuged at 105,000× g for 30 minutes. The 105,000× g supernatants were then fractionated using $(NH_4)_2SO_4$. The precipitation which formed at 0–30 percent saturation was collected by centrifugation at 20,000× g and dissolved in Tris-magnesium buffer and dialyzed overnight against the same buffer. A second $(NH_4)_2SO_4$ fraction was obtained by raising the concentration of the first supernatant to 50 percent. These two $(NH_4)_2SO_4$ fractions as well as the supernatant from the 30–50 percent cut were then assayed for PDE activity using the method of Appleman, *Biochemistry*, 10, 311 (1971). The first fraction obtained from lung and kidney tissues was found to contain a PDE with low affinity for 3', 5'-cyclic AMP (high Km). The second fraction was found to exhibit a biphasic curve when the Lineweaver-Burk method of analysis was used. This indicates either the presence of two separate enzymes, one having a high and the other a low affinity for the enzymes, or one protein with two separate sites. Appleman, supra, indicates that extracts of brain yield two separate enzymes (a high Km and a low Km) which can be separated by sepharose gel chromatography.

All of the inhibitory studies reported here were performed with the high affinity (Fraction II, low Km) enzyme obtained from rabbit lung and kidney or beef heart. $I_{50}$ values were calculated in some instances from a plot of log I vs. percent I in experiments in which inhibitor concentration was varied over a wide range, at a constant 3', 5'-cyclic AMP concentration of approximately $1.7 \times 10^{-7}$ M. The relative inhibitory activity of each compound as compared with theophylline is expressed as an α value. This value is obtained by dividing the $I_{50}$ value obtained for the particular compound being evaluated into the $I_{50}$ of theophylline. In most instances α values were calculated from an inhibition study performed with a single concentration of test compound as long as the inhibition produced by that concentration was from 20-80%. In this instance an α value was calculated by dividing the concentration of theophylline giving the same (X%) inhibition concentration of test substance giving x% inhibition.

The validity of this method has been checked by comparing values obtained by (1) measurements at a single concentration of inhibitor and (2) measurements at several concentrations of inhibitor ($I_{50}$ determinations). α values compared in this way have been found to agree to within 10% of each other.

The basic incubation mixture contained the following substances (amounts in μmoles): $^3$H-cAMP (specific activity ~2,180 cpm/pmole), .00016; Tris pH 7.5, 40; $MgCl_2$, 0.5; Enzyme (cAMP phosphodiesterase), 5–50 μg protein; and $10^{-4}$ to $10^{-6}$ molar concentration of the inhibitor; incubation time 10 minutes at 30°C. At the end of incubation the mixtures are heated to 90°C for 2 minutes and 100 μg of snake venom phosphodiesterase from Crotalus atrox was added and the tubes incubated for 10 minutes at 30°C. The mixture was then cooled and 1 ml of a Dowex 1-2X, 200-400 mesh suspension, prepared by mixing 100 g of the resin in 200 g $H_2O$, was added and the mixture centrifuged. An aliquot of the supernatant was used to determine counts per minute using a liquid scintillation counter. Zero time values were obtained using incubations in which the cAMP phosphodiesterase was omitted from the first incubation.

The inhibition results, along with the protein kinase and adrenyl steriodogenesis activity and phosphodiesterase degradation resistance, are set forth in Table 1.

EXAMPLE IX

Activation Of Bovine Brain Protein Kinase

Cyclic AMP-dependent protein kinase was purified to the stage of DEAE cellulose chromatography from bovine brain using the procedure of Miyamoto et al., *J. Biol. Chem.* 224, 6395 (1969). Protein kinase activity was assayed by measuring the incorporation of $^{32}$P-phosphate into histone from γ-$^{32}$P labeled ATP. The incubation mixture contained (amounts in γmoles): sodium glycerol phosphate buffer, pH 6, 10; γ-$^{32}$P-ATP, ~2 × $10^6$ cpm, 0.001; magnesium acetate, 2; sodium fluoride, 2; EDTA, 0.06; histone, 40 – 400 μg; cAMP, cGMP or analog as indicated; purified protein kinase, 5–25 μg in a final volume of 0.2 ml. Activation constants (Ka) were determined according to the procedure of Muneyama et al., infra. The Ka values relative to cyclic AMP (Ka') are reported in Table I.

EXAMPLE X

Resistance To Phosphodiesterase (PDE) Degradation

The cyclic AMP phosphodiesterases used were ammonium sulfate precipitates of 100,000× g supernatants prepared from tissue homogenates of rabbit kidney. The ability of the analogs to serve as substrates for the cAMP phosphodiesterase was measured by the previously described method of Muneyama et al, *Biochemistry* 10, 2390 (1971). Inorganic phosphate, released from the 5'-monophosphate formed upon treatment of the analog with PDE was determined colorimetrically. The inorganic phosphate release was effected with snake venom 5'-nucleotidase or *E. coli* alkaline phosphatase. The basic mixture contained the following (amounts in μmoles): Tris buffer, pH 7.5, 40; magnesium acetate, 25; cAMP or analog, 0.1; enzyme, 100–500 μg in a final volume of 1.0 ml. One unit of activity was defined as that amount of enzyme catalyzing the hydrolysis of 1.0 μmole in 10 minutes at 37°C. Table I reports rates of analog hydrolysis relative to cyclic AMP (α).

EXAMPLE XI

Activation Of Adrenal Steroidogenesis

Suspensions of rat adrenal cells were prepared by the general technique of Kloppenborg et al., *Endocrinology* 82, 1053, (1968). Decapsulated adrenal quarters from male Sprague-Dawley rats were suspended in a buffer of Krebs-Ringer bicarbonate-albumin-glucose (KRBAG) (pH 7.4) prepared according to DeLuca and Cohen (1964)* and containing bovine albumin (3 g/100 ml) and glucose (0.2 g/100 ml). Collagenase (5 mg/ml) was added to quarters of 32 adrenals in 10 ml of KRBAG. The tissue was digested for 1 hour at 35°, under 95% $O_2$–5% $CO_2$, in a New Brunswick gyrotory bath oscillating at 120 cycles/min. After digestion, the tissue was gently dispersed by repeated passage through a Pasteur pipet. The suspended cells were collected by centrifugation at 4° for 10 min. at 480 g, followed by two cycles of washing and recentrifugation in the original volume of KRBAG. The washed cell pellet was then resuspended in KRBAG (1 adrenal/ml) and filtered through a stainless steel sieve with perforations of 0.2 mm, in order to remove any large particles of undigested tissue.

(* in Manometric Techniques, 4th ed, Umbreit, W. W., Burris, R. H., and Stauffer, J. F., Ed., Minneapolis, Minn., Burgess, pp 132–133.)

Incubations were conducted at 35° for 2 hours, under 95% $O_2$–5% $CO_2$. Each 2.5 ml incubation mixture contained 1 ml of adrenal cell suspension.

TABLE I

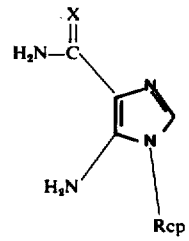

TABLE I

| X | Phosphodiesterase Substrate α (Kidney) | Phosphodiesterase Inhibition α Lung | Phosphodiesterase Inhibition α Heart | Protein Kinase Ka' | Adrenal Steroidogenesis $A_{50}$, μm* |
|---|---|---|---|---|---|
| $NOCH_3$ | 0.16 | 0.2 | 0.5 (kidney) | 0.006 | 5500 |
| $NOC_2H_5$ | 0.14 | 0.6 | 0.3 | 0.0005 | |
| $NOCH_2C_6H_5$ | 0.46 | | | | 1400 |
| O | 0.12 | 1.9 | | 0.006 | inactive |
| S | 0.79 | 2.5 | 2.0 | 0.02 | |
| NH | 0.03 | 0.5 | | 0.003 | inactive |
| NOH | 0.01 | | 0.2 (0.1 kidney) | 0.002 | 7000 |

*Adrenal steroidogenesis, cAMP-3300 μm.

It will be observed from the foregoing table that certain of the compounds of the present invention are effective inhibitors of phosphodiesterase enzyme, in some cases being twice as effective as theophylline and also capable of selective inhibition. It will also be observed that certain compounds of this invention are quite effective as activators of adrenal steriodogenesis at approximately the same concentration as cyclic AMP. Additionally, 5-amino-1-$\beta$-D-ribofuranosylimidazole-4-carboxamidine 3', 5'-cyclic phosphate (Compound 3) has demonstrated moderate activity as a depresser of rat blood pressure at 25 mg/kg in an antihypertensive screen.

In light of the foregoing description of the preferred embodiments of the invention, variations within the spirit and scope of the same will be apparent to those skilled in the art. For example, the cyclic nucleotides of this invention may be employed in the form of their physiologically acceptable salts, as for example, ammonium, alkali metal and alkyl amine salts, obtained by neutralization of the free nucleotide with bases appropriate to the desired end. The O-acylated, that is, the $C_1$–$C_{18}$ acyl, analogs may be obtained by reaction of the free nucleotides or salts thereof with corresponding acid anhydrides or acyl halides in base. Sutherland et al., *Biochem. Et. Biophys. Acta.* 148, 106 (1967) have demonstrated that acylation of cyclic AMP enhances cellular transport of purine nucleotides.

We claim:
1. A compound of the structure

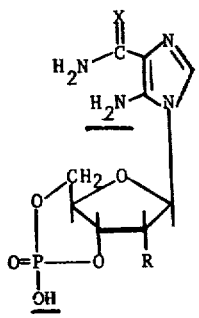

wherein X is NH or NOR$_1$ where R$_1$ is H, C$_1$ to C$_8$ branched or linear alkyl or aralkyl and R is H, OH, or OR' where R' is C$_1$ to C$_{18}$ acyl.

2. The compound of claim 1 in which R$_1$ is C$_1$ to C$_8$ linear or branched alkyl or benzyl.

3. The compound of claim 2 in which R$_1$ is CH$_3$.

4. The compound of claim 2 in which R$_1$ is C$_2$H$_5$.

5. The compound of claim 2 in which R$_1$ is CH$_2$—C$_6$H$_5$.

6. A process of synthesizing 5-amino-4 substituted imidazole nucleotide comprising alkylating adenosine 3', 5'- cyclic phosphate-1-N-oxide with an alkylating compound selected from the group consisting of saturated and unsaturated C$_1$ to C$_{18}$ alkyl halides or benzyl halides, to provide the corresponding O-alkylated adenosine 3', 5'- cyclic phosphate-1-N-oxide, and subjecting said O-alkylated adenosine 3', 5'- cyclic phosphate-1-N-oxide to base-catalyzed hydrolysis at a pH of at least 10 to afford N-alkoxy-5-amino-1-$\beta$-D-ribofuranosylimidazole-4-carboxamidine 3', 5'-cyclic phosphate.

7. The process of claim 6 in which the N-alkoxy-5-amino-1-$\beta$-D-ribofuranosylimidazole-4-carboxamidine 3', 5'-cyclic phosphate is subsequently treated with an aqueous solution of pyridine containing a molar excess of hydrogen sulfide to yield 5-amino-1-$\beta$-D-ribofuranosyl-thioimidazole-4-carboxamide 3', 5'-cyclic phosphate.

8. The process of claim 6 in which the N-alkoxy-5-amino-1-$\beta$-D-ribofuranosylimidazole-4-carboxamidine 3', 5'-cyclic phosphate is subjected to a reductive treatment to provide 5-amino-1-$\beta$-D-ribofuranosylimidazole-4-carboxamidine 3', 5'-cyclic phosphate.

9. The process of claim 8 in which said reductive treatment is by catalytic hydrogenation.

10. The process of claim 9 in which the catalytic hydrogenation is carried out in the presence of sponge nickel catalyst.

11. The process of claim 8 in which said 5-amino-1-$\beta$-D-ribofuranosylimidazole-4-carboxamidine 3', 5'-cyclic phosphate is subjected to alkaline hydrolysis to provide 5-amino-1-$\beta$-D-ribofuranosylimidazole-4-carboxamide 3', 5'-cyclic phosphate.

12. A process of synthesizing 5-amino-4-substituted imidazole nucleotides comprising subjecting adenosine 3', 5'-cyclic phosphate-1-N-oxide to base catalyzed hydrolysis at a pH of at least 10 to afford 5-amino-1-$\beta$-D-ribofuranosylimidazole-4-carboxamidoxime 3', 5'-cyclic phosphate.

13. 5-Amino-1-$\beta$-D-ribofuranosylimidazole-4-carboxamidine 3', 5'-cyclic phosphate.

14. 5-Amino-1-$\beta$-D-ribofuranosylimidazole-4-carboxamidoxime 3', 5'-cyclic phosphate.

15. The compound of claim 1 in which X is NOR$_1$, R is OH, and R$_1$ is C$_1$ to C$_8$ linear or branched alkyl or phenyl.

16. The compound of claim 15 in which R$_1$ is CH$_3$.

17. The compound of claim 15 in which R$_1$ is C$_2$H$_5$.

18. The compound of claim 15 in which R$_1$ is CH$_2$—C$_6$H$_5$.

* * * * *